US008834141B2

(12) United States Patent  (10) Patent No.: US 8,834,141 B2
Cooke et al.  (45) Date of Patent: Sep. 16, 2014

(54) IMPRESSION SYSTEM

(75) Inventors: Derek Michael Cooke, Warren, NJ (US); Kevin Allen Cooke, Lafayette, NJ (US)

(73) Assignee: Orchard Hill Memorial Park, Inc., Lafayette, NJ (US)

( * ) Notice: Subject to any disclaimer, the term of this patent is extended or adjusted under 35 U.S.C. 154(b) by 57 days.

(21) Appl. No.: 13/599,447

(22) Filed: Aug. 30, 2012

(65) Prior Publication Data
US 2014/0065252 A1   Mar. 6, 2014

(51) Int. Cl.
*B29C 33/40* (2006.01)
*B29C 43/36* (2006.01)

(52) U.S. Cl.
CPC .................................. *B29C 33/40* (2013.01)
USPC ............... 425/2; 264/222; 264/223; 462/1; 249/170; 249/171; 220/4.23; 220/531

(58) Field of Classification Search
CPC .... B29C 33/40; B29C 67/20; B29C 2059/02; B29C 59/02; B29C 59/022
USPC ........... 425/2; 264/222, 223; 462/1; 249/119, 249/121, 139, 160, 161, 170, 171; 220/4.21, 4.22, 4.23, 503, 529, 531
See application file for complete search history.

(56) References Cited

U.S. PATENT DOCUMENTS

| 4,450,122 | A | * | 5/1984 | Gallina | 264/46.6 |
| 5,578,260 | A | * | 11/1996 | DeSena | 264/223 |
| 7,341,509 | B2 | | 3/2008 | Champion | |
| 7,454,857 | B1 | * | 11/2008 | Monjello | 40/722 |
| 2002/0030302 | A1 | | 3/2002 | Cleary et al. | |
| 2008/0011744 | A1 | * | 1/2008 | Cheng | 220/4.22 |
| 2009/0145804 | A1 | * | 6/2009 | Kabel | 206/783 |
| 2010/0323773 | A1 | | 12/2010 | Ross | |

OTHER PUBLICATIONS

Bio-Foam Impression Foam Casting, [Internet webpage], "Bio-Foam Casting 12-13-2013.pdf", (current website: http://www.biofoamimpression.com/casting; archived webpage image dated Dec. 24, 2010, retrieved Dec. 13, 2013 from the Internet Archive Wayback Machine, http://web.archive.org/web/20101224183427/http://www.biofoamimpression.com/casting).*
Bio-Foam, [Internet webpage], "Bio-Foam Product 12-13-2013.pdf", (current website: http://www.biofoamimpression.com/; archived webpage image dated Nov. 6, 2010, retrieved Dec. 13, 2013 from the Internet Archive Wayback Machine, http://web.archive.org/web/20101106083008/http://www.biofoamimpression.com/).*
Lightning Powder Company, "Bio-Foam MSDS.pdf", MSDS for Bio-Foam Impression Foam, dated Nov. 18, 2002.*
website: http://www.pawsofremembrance.com, "Paws of Remembrance", printed Oct. 31, 2011 and Sep. 26, 2011.
website: http://www.distinctive-urns.com/pet_grave_memorials/clay_imprint.pnt, printed Oct. 31, 2011.
website: http//www.biofoamimpressions.com, printed Sep. 26, 2011 with Material Safety Data Sheet.

\* cited by examiner

*Primary Examiner* — Joseph S Del Sole
*Assistant Examiner* — Lawrence D Hohenbrink, Jr.
(74) *Attorney, Agent, or Firm* — Nelson Mullins Riley & Scarborough LLP

(57) ABSTRACT

An impression system is provided for capturing an anatomical impression of an animal. The impression system comprises a foam that substantially retains an impression after application of pressure and subsequent removal of pressure and a case having a recessed area for receiving the foam and a case for retaining the foam therein. The system further comprises a cover having a viewing pane attachable to the case for providing viewing of the foam when closed.

14 Claims, 16 Drawing Sheets

IMPRESSION SYSTEM

FIELD OF THE INVENTION

The present invention relates to an impression system for a pet, more particularly to an impression system as a keepsake for a pet owner to memorialize a pet or other animal.

BACKGROUND OF THE INVENTION

The pet industry is a growing industry. For the time and expense that many people devote to their pets, it is often desirable to a pet owner to memorialize their pet, living or deceased. One such memento is a paw print of the animal.

A typical way of making a paw imprint is by utilizing a clay type solution comprising hot water, salt, cold water and cornstarch. The ingredients must be boiled and combined, and then whisked constantly until the mixture becomes a stiff dough. The dough is then kneaded until firm, and then rolled into the desired shape or placed into a presentation case. For these types of impression kits, once the paw imprint is made in the clay or dough, the clay must air dry or bake for up to 48 hours. This causes significant delay and additional cost in creating the keepsake. If an oven is used to bake and permanently secure the imprint in the clay, this step must be performed prior to the clay being inserted into the presentation case so as not to melt or otherwise damage the presentation case. In addition, this step requires the use of an oven, which adds further expense to creating the keepsake. Accordingly, a need exists for an impression system that overcomes existing disadvantages such as increased drying cycle time, use of additional equipment such as ovens and/or dryers, and increased energy costs for additional processing steps. These needs are addressed by the impression system of the present invention.

SUMMARY OF THE INVENTION

An impression system is provided for capturing and for display of an anatomical impression of an animal. The impression system comprises: a foam that substantially retains an impression after application of pressure and subsequent removal of pressure, and a case having a recessed area for receiving the foam. The impression system further comprises a cover having a viewing pane and a case for containing the foam inside of the case.

As such, the system of the present invention serves as a keepsake or memento of an alive or a deceased pet or other animal. The system provides a display for an impression of an animal paw and optionally for other memorabilia or keepsakes. The system of the present invention overcomes the difficulties associated with clay impression mediums in order to create an easy to assemble and lasting keepsake for a pet owner.

As a feature of the invention, the impression system comprises a cover having a viewing pane or window. The viewing pane or window is comprised of a transparent material. The transparent material is preferably rigid. The viewing pane or window is formed as part of or affixed to the cover. The cover is attachable to the case, for example, by a hinge such that the cover pivots between an open and closed position. Alternatively, the cover is snapped or slid onto or otherwise affixed to the case. When in the closed position, the cover is secured to the case. As another feature of the present invention, the cover optionally comprises an upper lid and a lower lid. Each of the upper lid and the lower lid is independently pivotable between an open and closed position. The upper lid is inserted in the lower lid.

As another feature of the present invention, the foam is a podiatric foam. The foam is formulated to receive an imprint on the surface of the foam by applying pressure. Advantageously, the foam of the present invention substantially retains the impression without additional steps to secure the impression therein. As such, no additional heating or drying steps are needed. In one embodiment, the foam comprises an expanded phenolic plastic, such as a fine-celled, thermoset phenolic plastic foam.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION OF THE INVENTION

Figure 1:
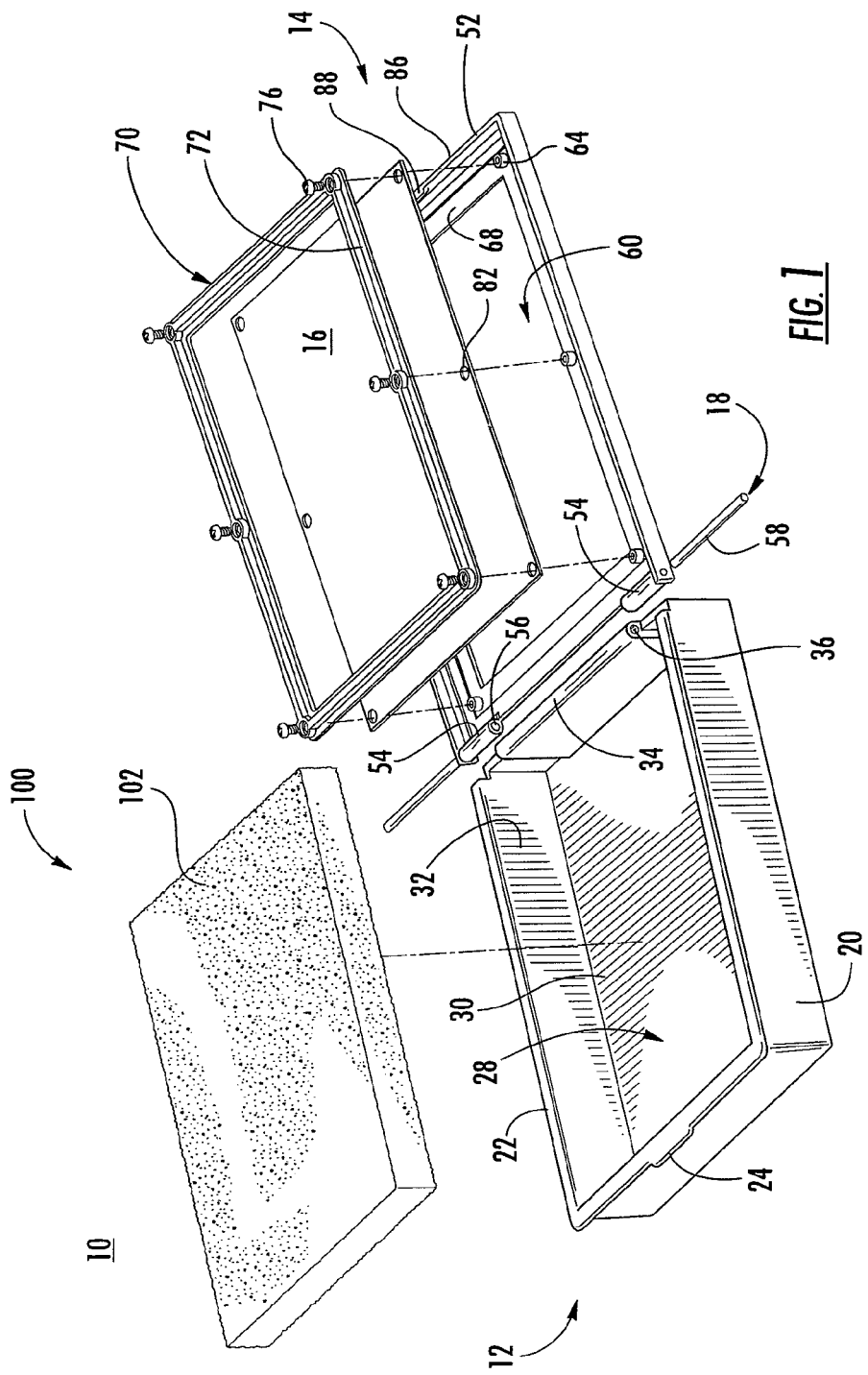
FIG. 1 is an exploded perspective view of an impression system within the scope of the present invention.

Referring now to the drawings and the following written description of the present invention, it will be readily understood by those persons skilled in the art that present invention is susceptible of broad utility and application. Many embodiments and adaptations of the present invention other than those herein described, as well as many variations, modifications, and equivalent arrangements will be apparent from or reasonably suggested by the present invention and the detailed description thereof, without departing from the substance or scope of the present invention. This disclosure is only illustrative and exemplary of the present invention and is made merely for purposes of providing a full and enabling disclosure of the invention. The foregoing disclosure is not intended nor is it to be construed to limit the present invention or otherwise to exclude any such other embodiments, adaptations or variations, modifications and equivalent arrangements, the present invention being limited only by claims that pended hereto and the equivalents thereof.

Referring to the figures, an impression system is shown in FIG. 1. In FIG. 1, an impression system 10 is shown in an exploded view illustrating the various components thereof. The impression system 10 comprises a case 12 and a cover 14. The cover 14 has an opening 60 for a viewing pane or window 16. The cover 14 optionally includes a display area for receiving a memento, such as a poem, photograph, or other piece of memorabilia. Alternatively, the cover 14 is solid or opaque. The cover 14 is attached to the case 12 by hinge 18 so that the cover 14 can be opened and closed accordingly. A foam 100 is disposed inside the case 12. The foam 100 is of a type suitable to receive an imprint or an impression in the foam by application of force, such as by pressing the paw of an animal thereupon, and to substantially retain the impression after subsequent removal of pressure.

As shown in FIG. 1, case 12 is rectangular in shape having four sidewalls 20 with an overhang or edge 22 on the upper surface thereof. It is within the scope of the present invention that the case 12 is of different shapes and sizes. An example of dimensions for an impression system having a rectangular shape is approximately 5 inches in length by 4 inches in width by 1 inch in height. However, an impression system, including those having a rectangular shape, is of any dimensions. The case 12 is constructed out of any number and type of materials, including but not limited to, metal, plastic, glass, polymeric materials, wood, paper, or any combination thereof. A cavity 28 is defined by the sidewalls 20 and is suitable for receiving the foam 100. The cavity 28 is defined by a base or floor 30 and inside surfaces 32 of side walls 20. A lip 24 extends from the edge 22 at one end of the case 12 for ease of opening and closing of the cover 14. At the opposite end of the case 12, the sidewall 20 includes a hinge support 34 that defines a channel 36 for receiving a rod or bolt 58. As discussed in detail below, the bolt 58 hingedly supports and secures the cover 14 to the case 12.

The cover 14 includes a frame 52 that fits the dimensions of the case 12. The frame 52 is shown as a separate element, but it is contemplated that the frame 52 could be formed integrally with one or more other elements comprising the cover 14. The frame 52 includes at least one hinge support 54 that defines a channel 56 for receiving the bolt 58 such that the bolt can be inserted through channel 56 and channel 36 to secure the frame 52 to the case 12 and allow for hinged rotation of the frame about an axis of rotation defined by the bolt 58. The frame 52 includes a lip 68 that extends inwardly from the outer edges of the frame 52, and the lip defines an opening 60 that is preferably sized so that an impression made in the foam 100 is viewable through the opening 60 when the frame 52 of cover 14 is in a closed position over the foam. The opening 60 also provides for a display area for receiving or displaying a memento, such as a photo or other memorabilia and for display of the impression in the foam 100. The frame 52 also defines a plurality of threaded channels 64 that are spaced around the perimeter of the frame 52 for securing screws.

The window 16, which is preferably rigid and formed from glass or a polymeric material, such as plexiglass or other acrylic, is removably attached to the frame 52. The window 16 is preferably clear, but could be tinted, partially opaque, or fully opaque. It is optionally formed integrally with one or more elements of the frame 52 and/or cover 14, and optionally forms part of the display area for receiving or displaying a memento. A plurality of openings 82 are defined by the window 16 and positioned to cooperate with the threaded channels 64 of the frame 52. A frame support 70 attaches to the frame 52 and holds the window 16 in place. The frame support 70 includes a frame rail(s) 72 defining a plurality of threaded channels (not shown) through which a screw(s) 76 engages and extends through the threaded channel(s), openings 82 of the window 16, and the threaded channels 64 of the frame 52. The window 16 is thus held in place between frame support 70 and the lip 68 of frame 52. Other structures and methods of securing the window 16 are also possible, such as by using adhesives, friction fits, tabs, or other devices.

The frame 52 also includes a flange 86 having a recessed portion 88 at one end opposite the hinge support 54. The flange 86 extends along three sides of the frame 52 and is positioned to correspond with the edges 22 of case 12. In particular, the flange 86 interfaces with the edge 22 in an interference or frictional fit when the cover 14 is moved to a closed position in order to secure the cover 14 to the case 12. The cover 14 is secured to the case 12 by use, for example, of a latch, lock, or other closure mechanism.

Figure 2:
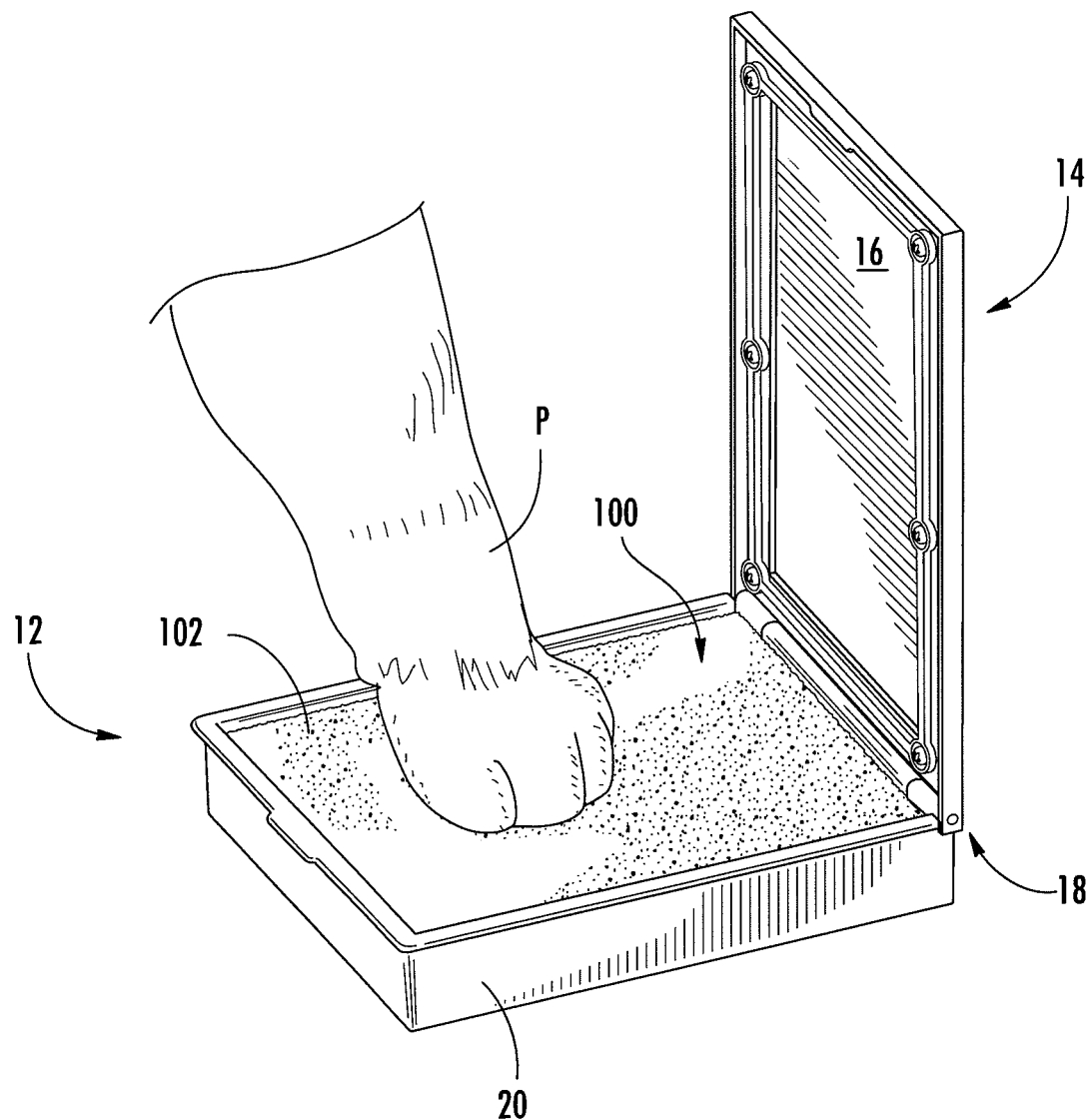
FIG. 2 is a perspective view of a paw of an animal being placed into the foam of the impression system of FIG. 1.
Figure 3:
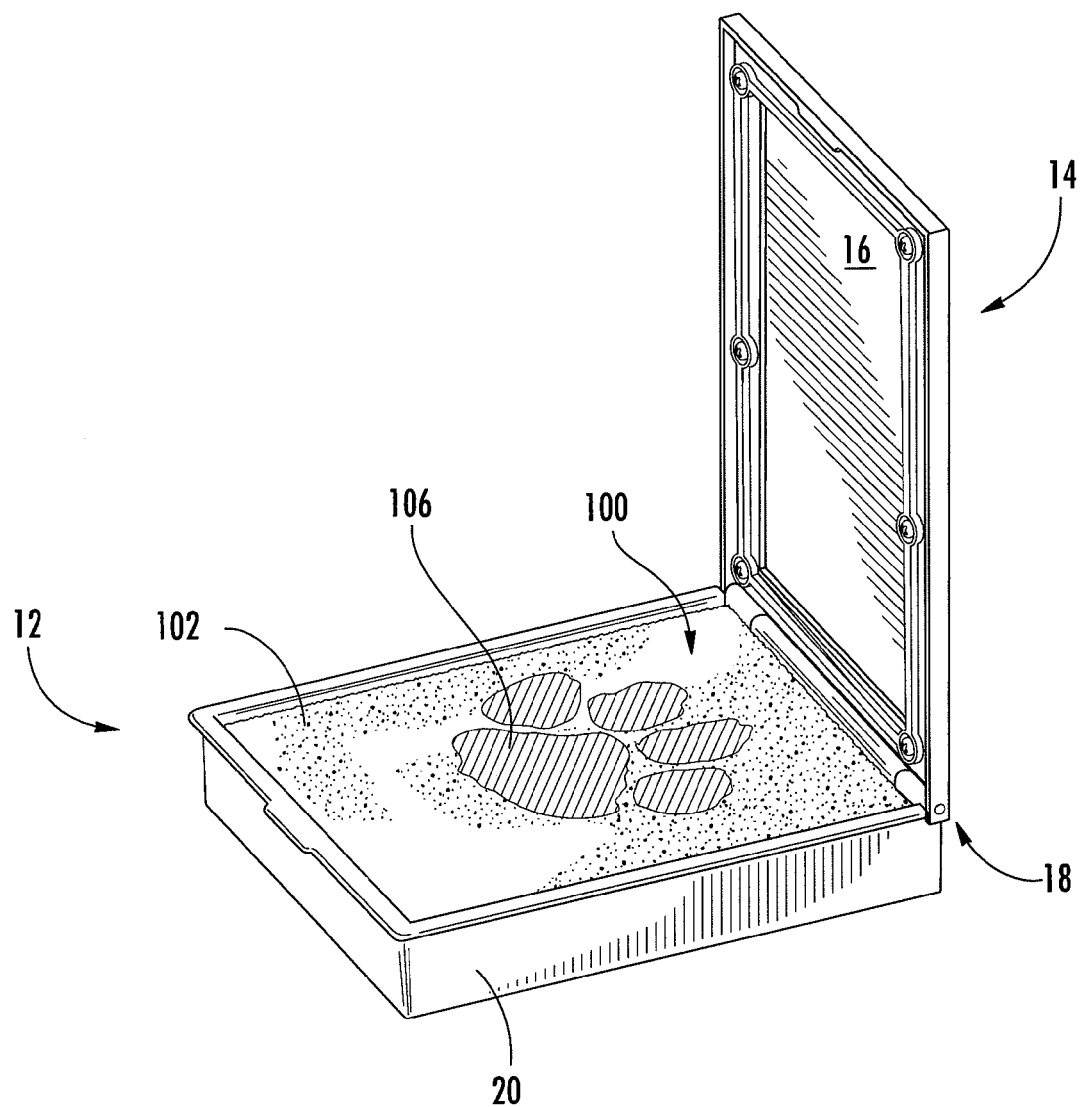
FIG. 3 is a perspective view of an impression of a pet paw retained in the foam of the impression system of FIG. 1.

Referring to FIGS. 2 and 3, the method of using the impression system 10 of the present invention is set forth herein. To open, cover 14 is pivoted away from the case 12, exposing the impression surface 102 of the foam 100 located in the case 12. A protective sheet or other protective material (not shown) is optionally present. The protective sheet, if present, is removed prior to creating an impression in the foam 100. The paw P or other object of which an impression is to be made is positioned over the foam 100, noting the orientation of the paw relative to the case 12 and cover 14 (portrait or landscape). The paw P is guided onto the impression surface 102 and pressure is applied, such as from the pad of the paw P up to the toes and claws, to form an imprint 106. Care should be taken so that the paw is not pushed all the way to the base 30 of the case 12 so as not to cause any undesired displacement of the foam 100. Advantageously, the foam 100 substantially retains the imprint 106 after pressure is removed. The method of using the system of the present invention requires heating steps or down time for heating or drying.

The foam 100 is of a type suitable to receive an imprint or an impression by application of force and to substantially retain the impression after subsequent removal of pressure. Preferably, the retention of the impression in the foam is permanent. Other desirable properties of the foam include, but are not limited to, compressible, ease of handling, durable, non-toxic, anti-bacterial, moisture-proof, and a combination thereof. Among the types of foams that are particularly suitable are moisture-proof, closed-cell, or fine-celled foams such as dry podiatric foams. An example of a commercially available dry podiatric foam is BIO-FOAM® foam from Smithers-Oasis Company. A suitable chemical composition for such a foam is an expanded phenolic plastic. The foam optionally comprises additives, catalysts, or other chemicals, including but not limited to barium sulfate and formaldehyde.

Figure 4:
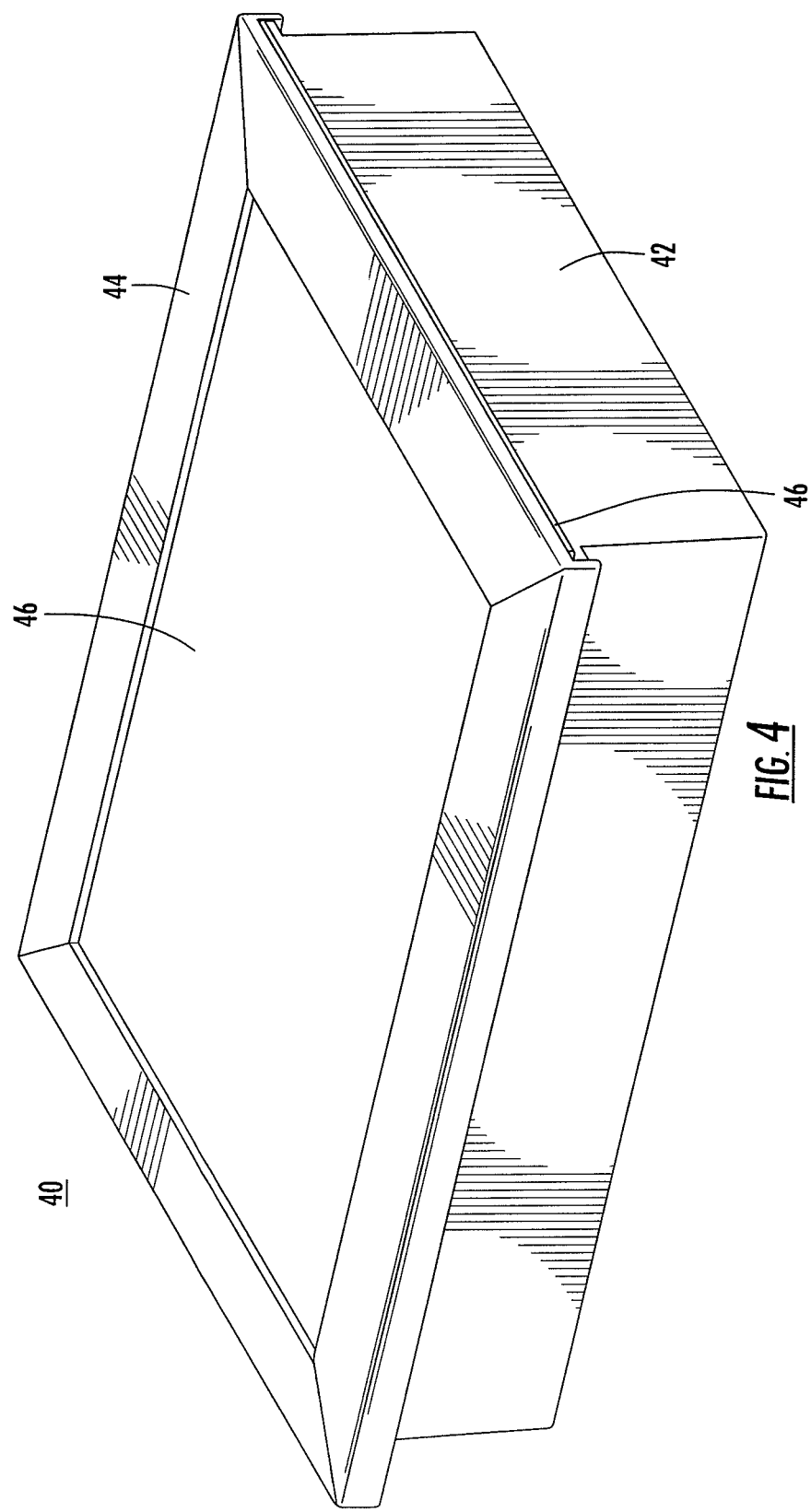
FIG. 4 is a perspective view of another embodiment of the impression system of the present invention.

Referring to FIG. 4, FIG. 4 is a perspective view of another embodiment of the impression system of the present invention. As shown in FIG. 4, the impression system comprises a case 42, a cover 44, and a viewing pane or window 46. The impression system of FIG. 4 does not require a hinge having a channel for receiving a bolt or rod for attachment of the cover to the case as in the embodiment of FIG. 1. The impression system of FIG. 4 provides an alternative approach for attachment of the cover to the lid by providing a built-in, compatible slotted construction of the case, the cover, or a combination thereof.

Figure 5:
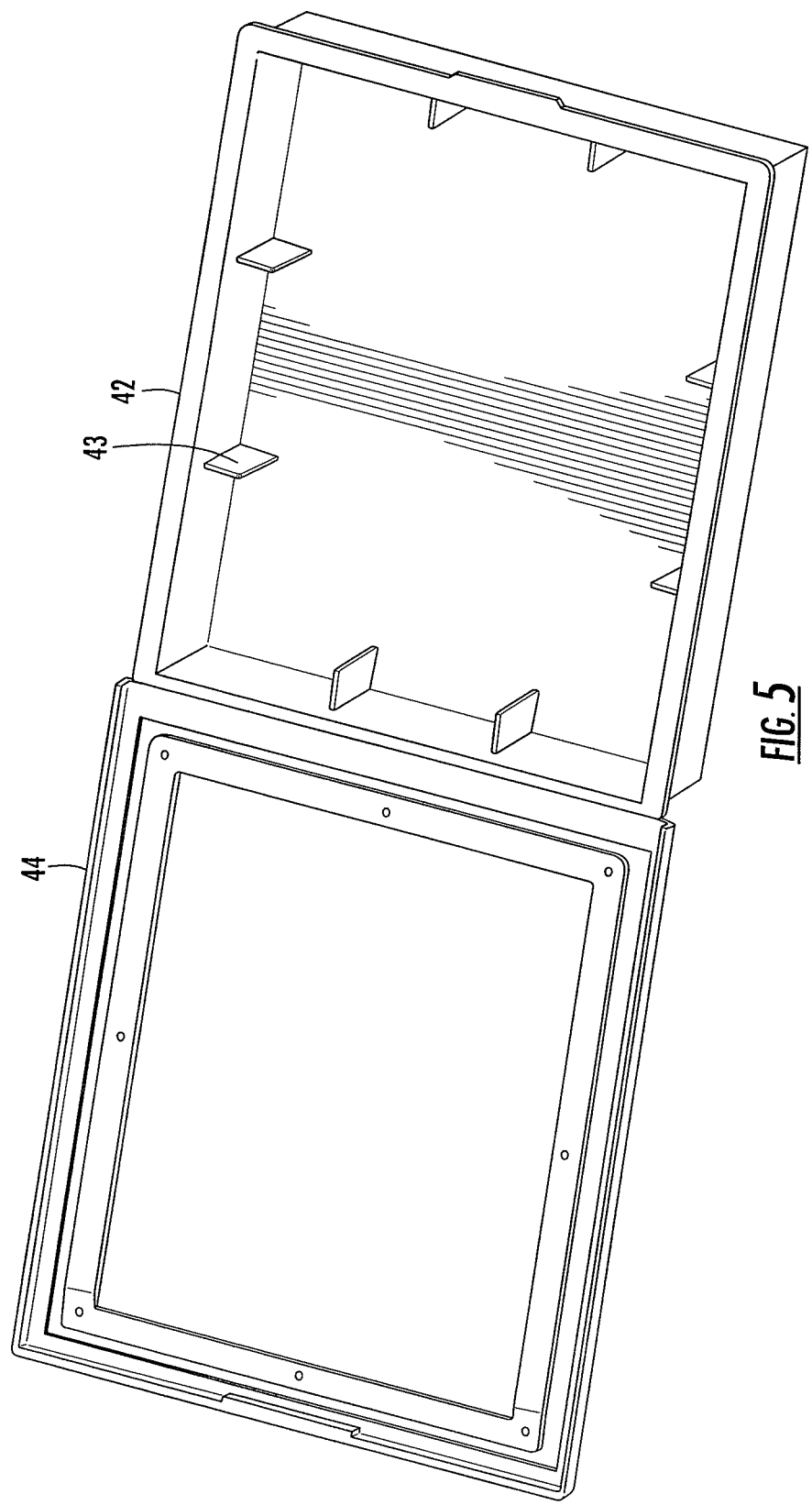
FIG. 5 is an illustrative view of the impression system of FIG. 4 with the bottom view of the cover with the impression system in an open position.
Figure 6:
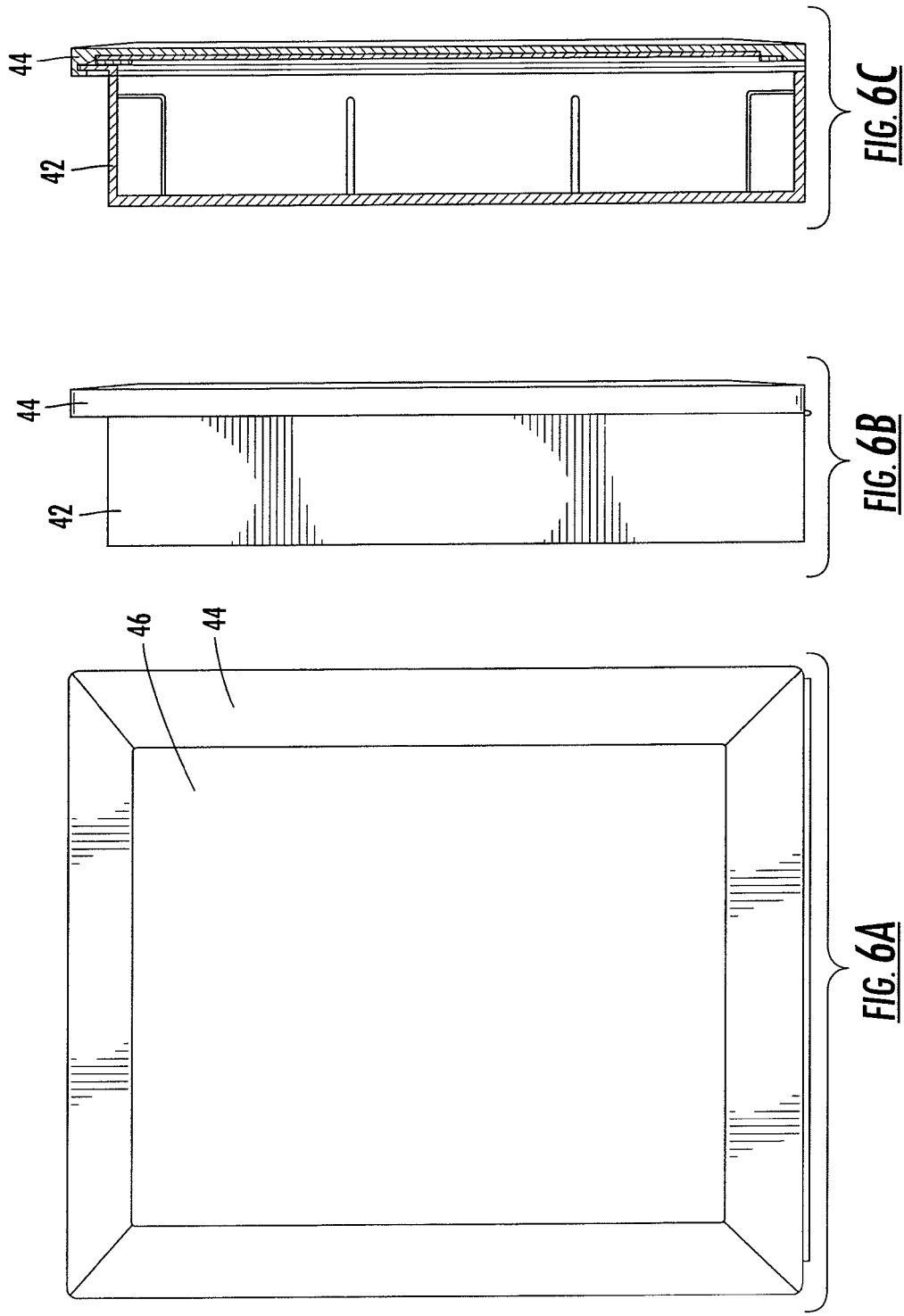
FIG. 6A is a top view of the impression system of FIG. 4.
FIG. 6B is a side view of the impression system of FIG. 6A.
FIG. 6C is a sectional side view of the impression system of FIG. 6A.

FIG. 5 is an illustrative view of the impression system of FIG. 4 with the bottom view of the cover with the impression system in an open position. It is noted that retention fins 43 are present to hold the foam in place. FIG. 6A is a top view of the impression system of FIG. 4. FIG. 6B is a side view of the impression system of FIG. 6A. FIG. 6C is a sectional side view of the impression system of FIG. 6A. These views illustrate the simplified construction of the cover and the case by which they matingly engage one another.

Figure 7:
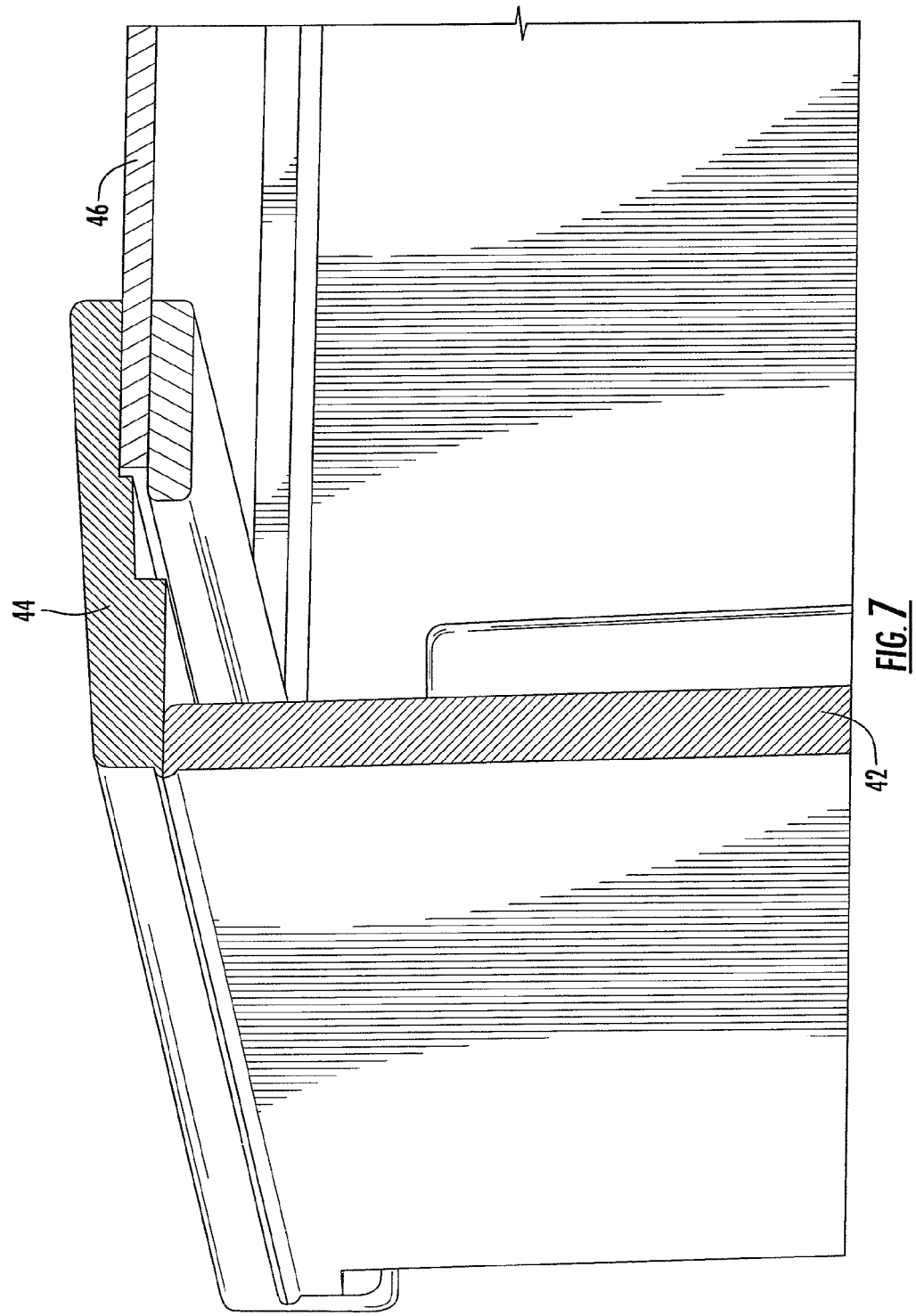
FIG. 7 is an enlarged sectional view of a corner of the impression system of the present invention in a closed position.

FIG. 7 is an enlarged sectional view of a corner of the impression system of the present invention in a closed position.

Figure 8:
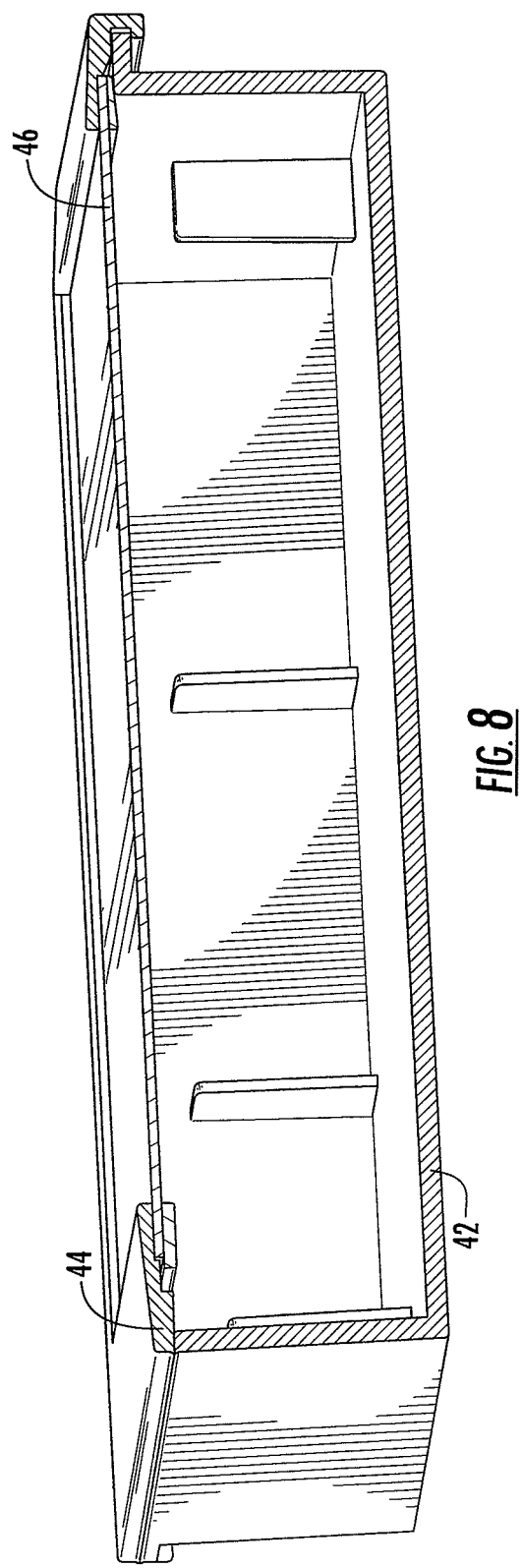
FIG. 8 is another side internal view of the impression system of FIG. 4.

FIG. 8 is another side internal view of the impression system of FIG. 4.

Figure 9:
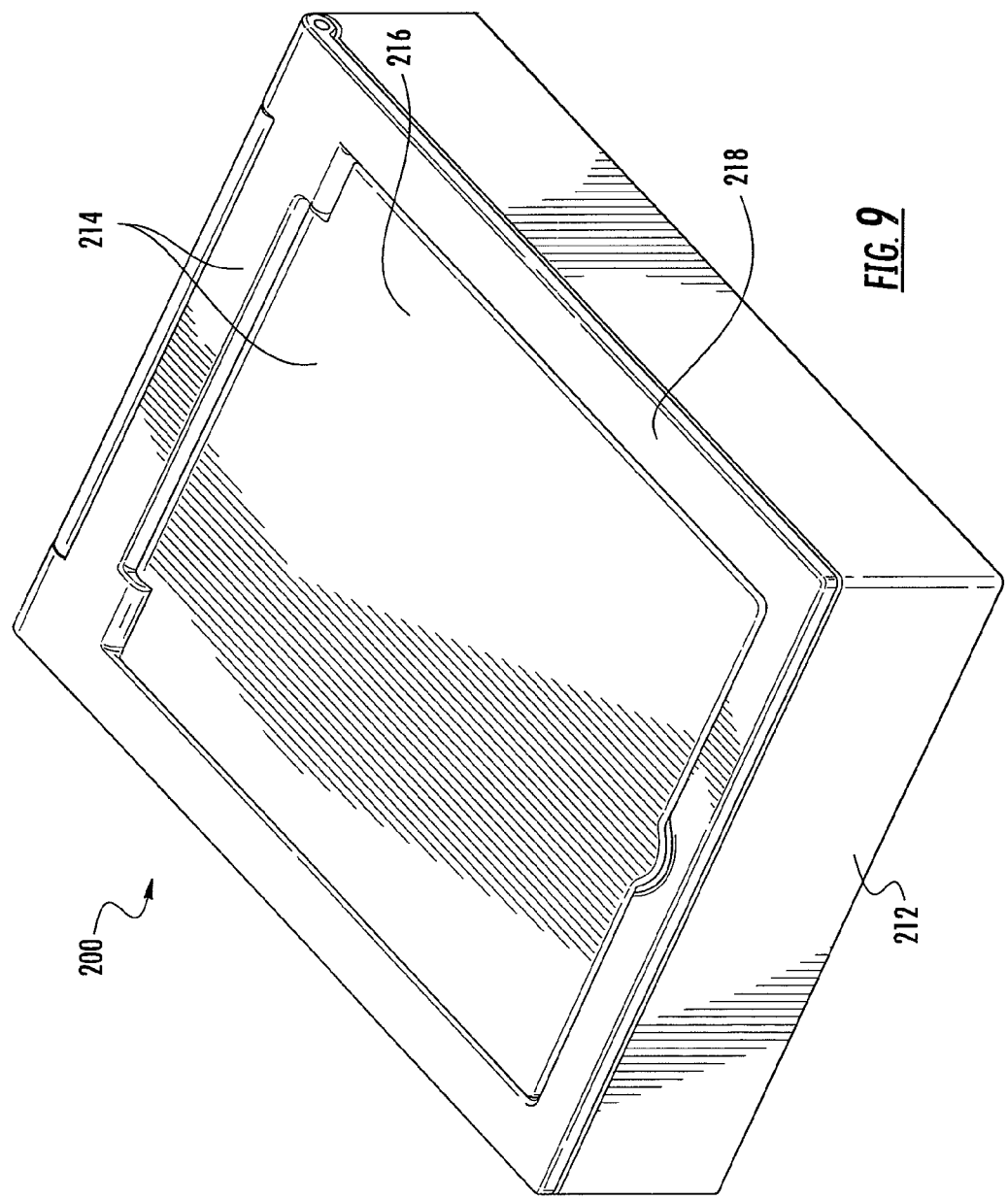
FIG. 9 is a perspective view of an impression system within the scope of the present invention in which the impression system has a cover with upper and lower lids.

Referring to the figures, FIG. 9 illustrates another embodiment of the impression system. In FIG. 9, impression system 200 is shown. The impression system 200 has a case 212 and a cover 214. The cover 214 has an upper lid 216 and a lower lid 218. A foam (not shown) is disposed inside the case 212. As discussed herein, the foam is of a type suitable to receive an imprint or an impression in the foam by application of force, such as by pressing the paw of an animal thereupon, and to substantially retain the impression after subsequent removal of pressure.

Figure 10:
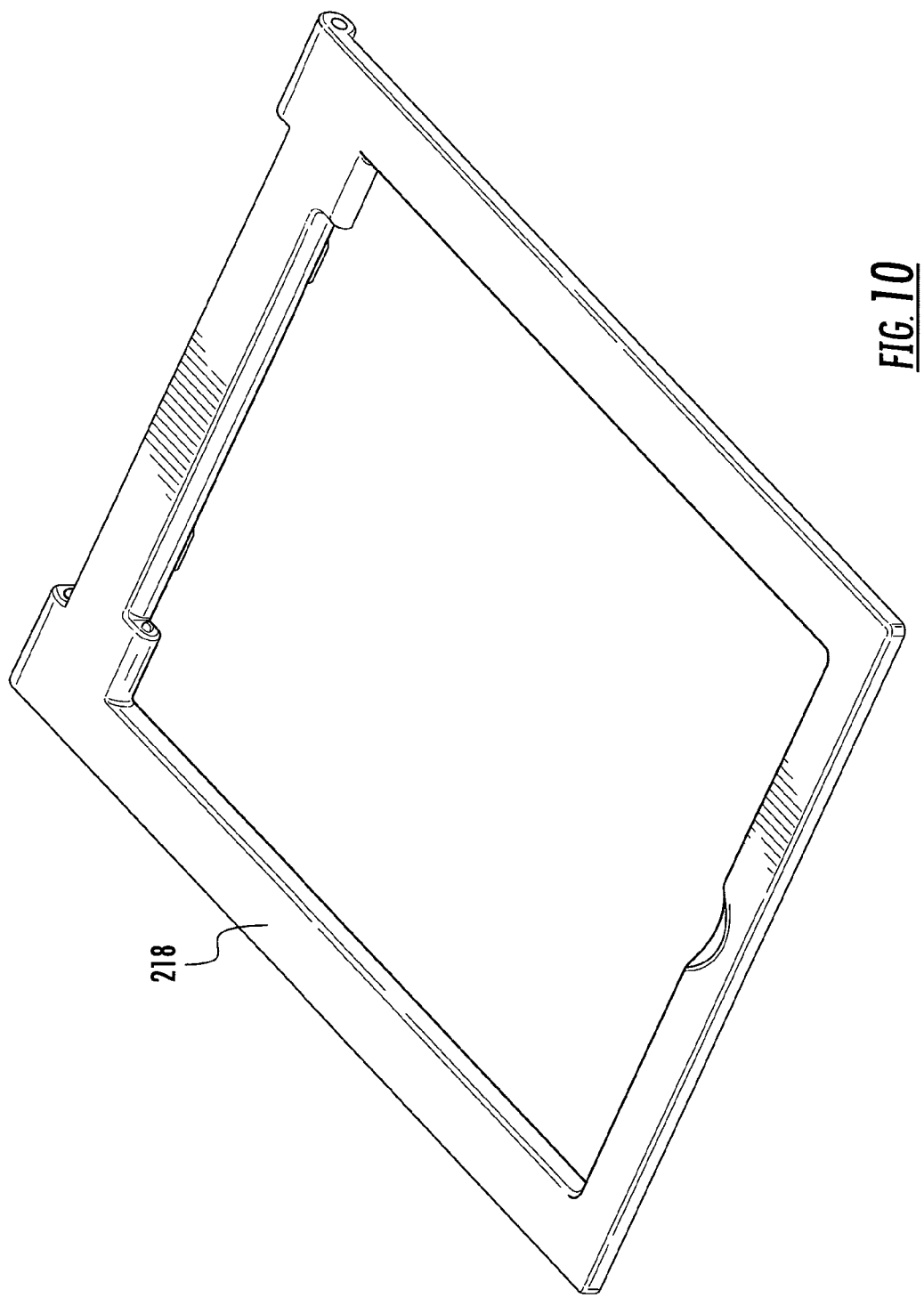
FIG. 10 is a perspective view of the lower lid of the cover in the impression system of FIG. 9.

FIG. 10 is a perspective view of the lower lid 218 of the cover 214 in the impression system of FIG. 9.

Figure 11:
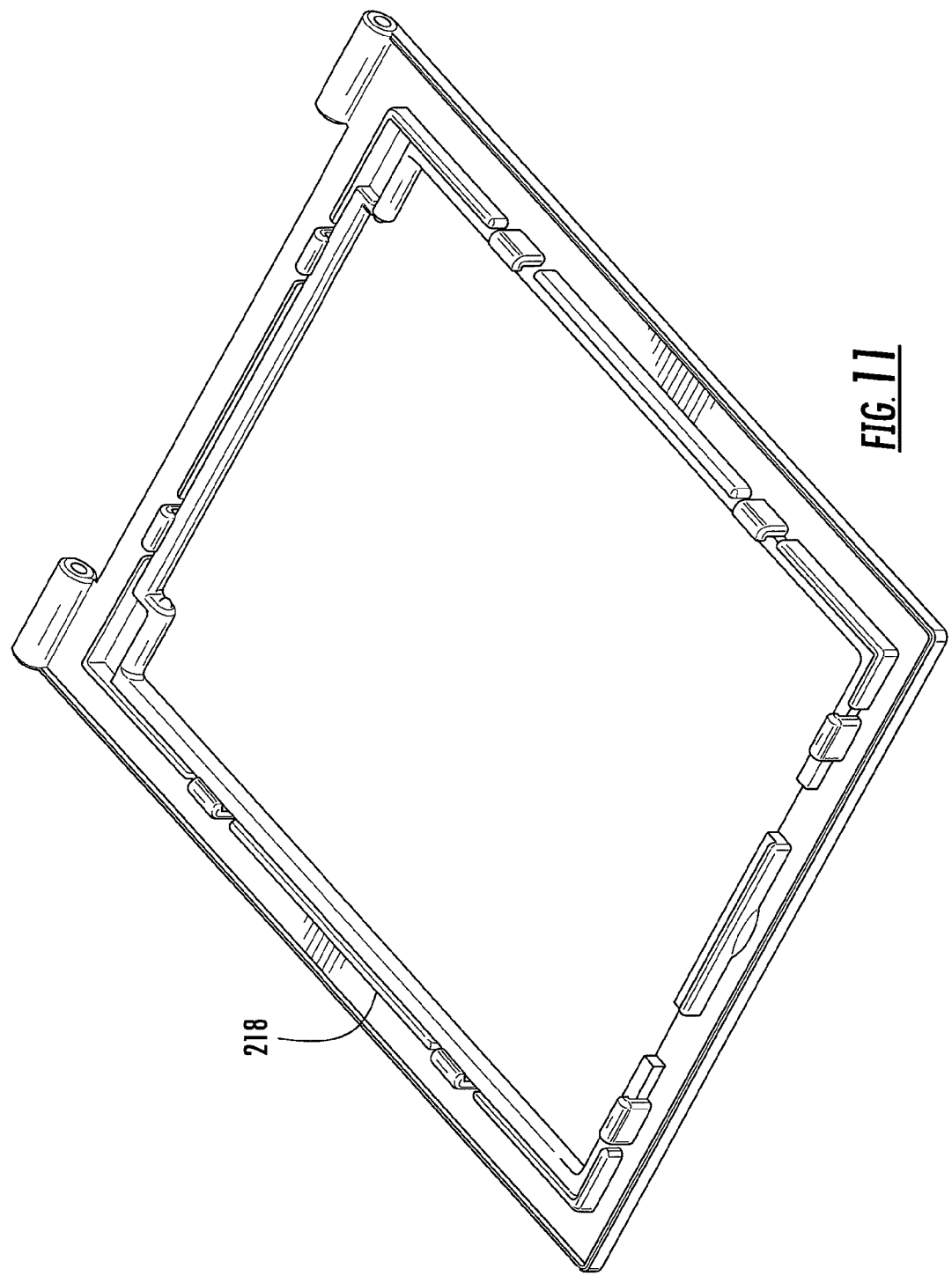
FIG. 11 is a perspective view of the underside of the lower lid of the cover of FIG. 10.

FIG. 11 is a perspective view of the underside of the lower lid 218 of the cover of FIG. 10.

Figure 12:
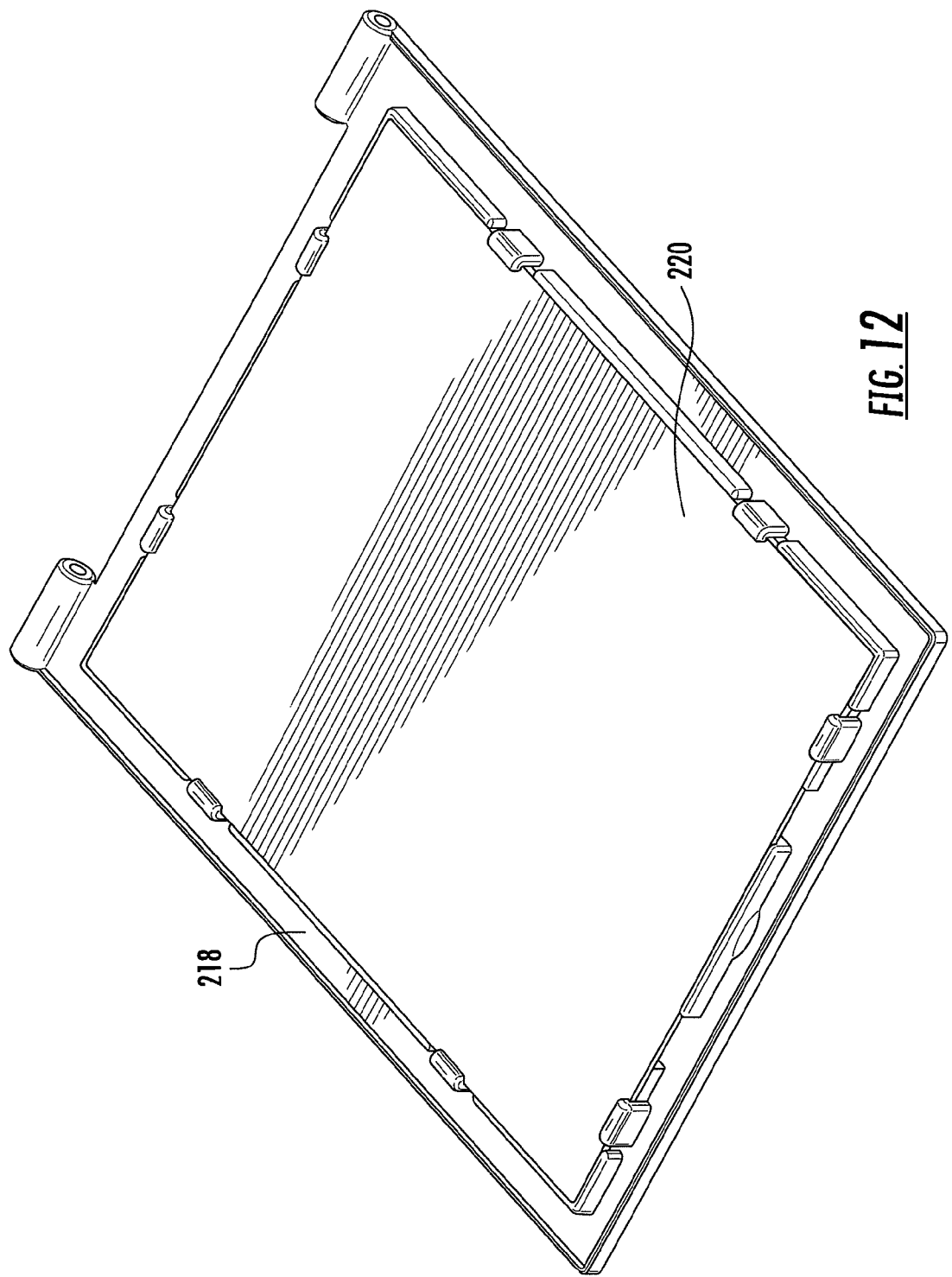
FIG. 12 is a perspective view of the underside of the lower lid of the cover of FIG. 10 with a transparent insert.

FIG. 12 is a perspective view of the underside of the lower lid 218 of the cover of FIG. 10 with a transparent insert 220.

Figure 13:
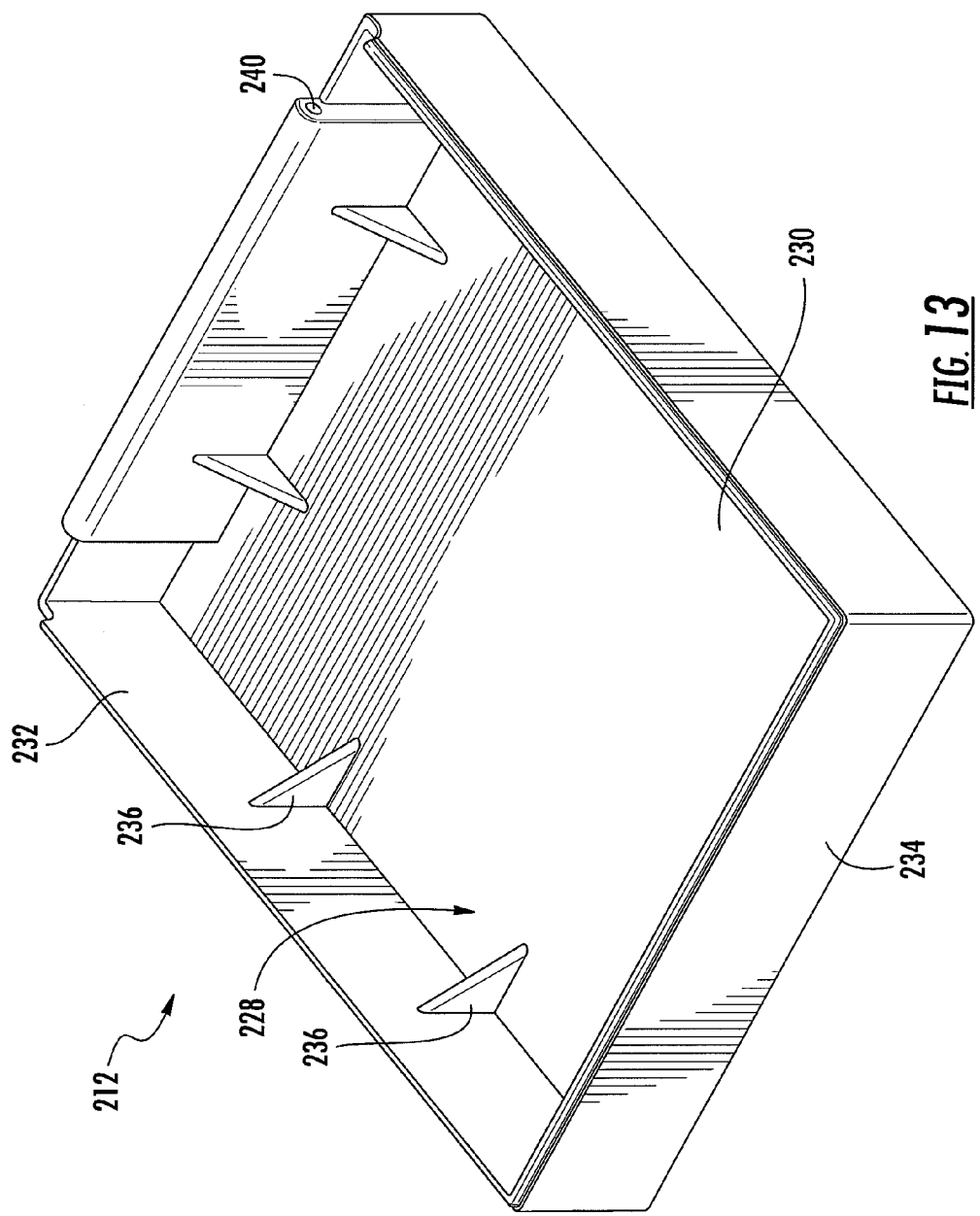
FIG. 13 is a perspective view of the case for receiving a foam.

FIG. 13 is a perspective view of the case 212 having a cavity 228 for receiving a foam. The cavity is defined by a base or floor 230 and inside surfaces 232 of side walls 234. The case also comprises retention fins 236 to hold the foam in place. Also, shown is a channel 240 for receiving a rod or bolt or other connector to attach the case 212 to the lower lid 218.

Figure 14:
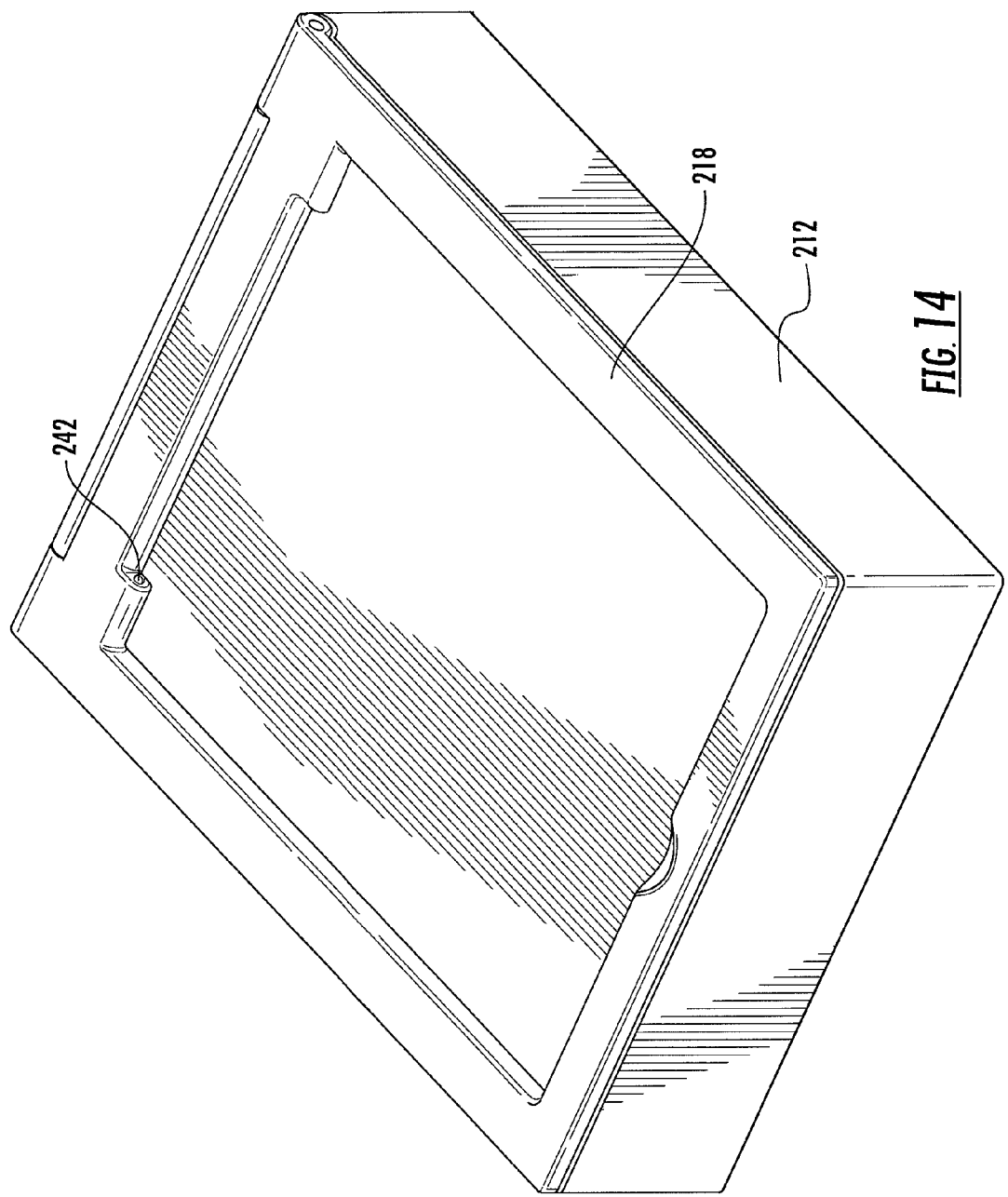
FIG. 14 is a perspective view of the lower lid of the cover and the case assembled.

FIG. 14 is a perspective view of the lower lid 218 of the cover assembled with the case 212. Also, shown is a channel 242 for receiving a rod or bolt or other connector to attach the upper lid (not shown) to the lower lid 218.

Figure 15:
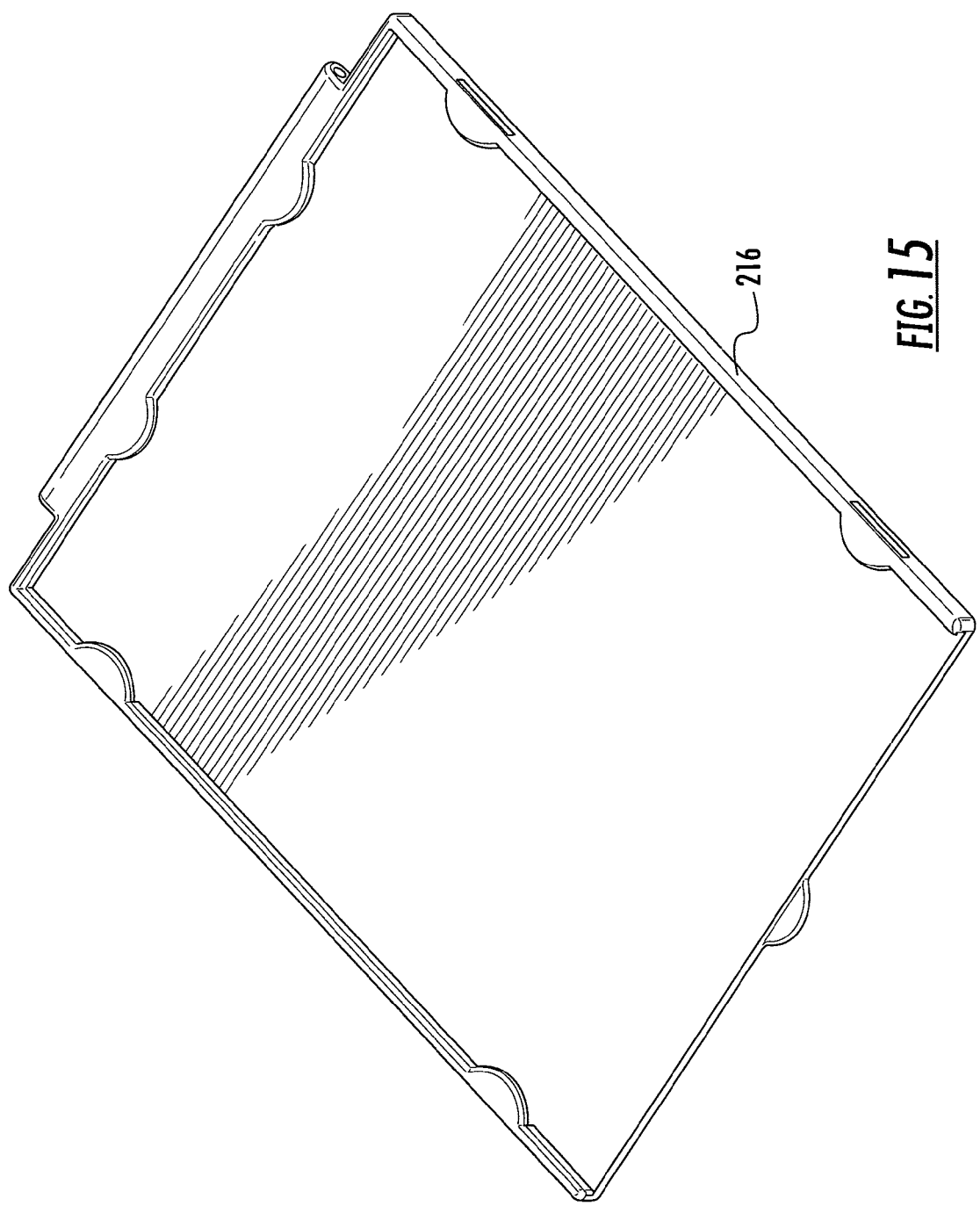
FIG. 15 is a perspective view of the underside of the upper lid of the cover.

FIG. 15 is a perspective view of the underside of the upper lid 216 of the cover.

Figure 16:
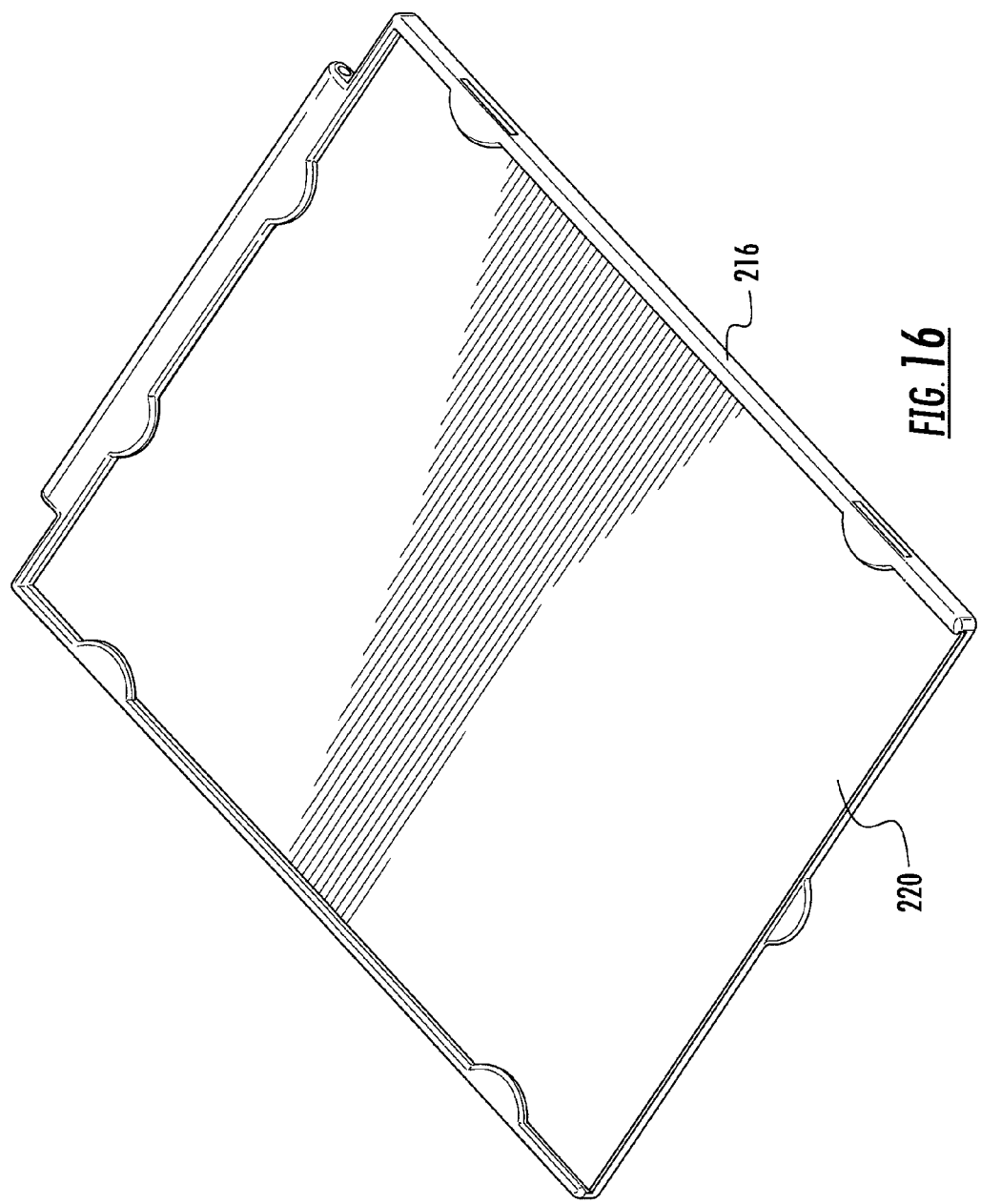
FIG. 16 is a perspective view of the underside of the upper lid of the cover with a transparent insert.

FIG. 16 is a perspective view of the underside of the upper lid 216 of the cover with a transparent insert 220.

Many modifications and other embodiments of the invention will come to mind to one skilled in the art to which this invention pertains having the benefit of the teachings presented in the foregoing description and the associated drawings. For example, it is within the scope of the present invention that instead of placing the actual paw of the pet on the foam, a mold or scan of the paw could be used to transfer an impression into the foam. In addition, the impression system could be used as an additional product or sales and marketing tool for veterinarians, animal breeders, shelters, and other businesses that treat, sell, and/or assist in the adoption of new animals. In particular, these or other businesses could create an impression of the animal as a memento to capture a particular moment or event, such as a pet adoption or birth. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An impression system for capturing an anatomical impression, comprising:
   a foam that substantially retains an anatomical impression after application of pressure and subsequent removal of pressure;
   a case having a recessed cavity area and sidewalls for receiving the foam,
   a cover having an upper lid and a lower lid,
   wherein at least one of the sidewalls comprises a hinge support that defines a first channel for receiving a first connector to hingedly attach the lower lid of the cover to the case, and
   wherein the lower lid of the cover has a second channel for receiving a second connector to hingedly attach the upper lid of the cover to the lower lid of the cover, and
   wherein the second connector is a rod or a bolt.

2. The system of claim 1, wherein the lower lid of the cover is movable between an open position and a closed position.

3. The system of claim 1, wherein the lower lid of the cover further comprises an edge to engage with the case when the cover is in a closed position.

4. The system of claim 1, wherein said foam is a podiatric foam.

5. The system of claim 4, wherein the podiatric foam is dry.

6. The system of claim 1, wherein the foam is a closed-cell foam.

7. The system of claim 1, wherein the foam comprises a phenolic plastic.

8. The system of claim 1, wherein the foam substantially retains the impression without the use of heat.

9. The system of claim 1, wherein the upper lid of the cover is movable between an open position and a closed position.

10. The system of claim 1, wherein the first connector is a rod or a bolt.

11. The system of claim 1, wherein the upper lid of the cover comprises a frame.

12. The system of claim 1, wherein a transparent viewing pane is formed as part of or affixed to the cover.

13. The system of claim 12, wherein the transparent viewing pane comprises a rigid material.

14. The system of claim 13, wherein the rigid material is selected from the group consisting of polymer and glass.

* * * * *